United States Patent
Kim et al.

(10) Patent No.: US 12,002,995 B2
(45) Date of Patent: Jun. 4, 2024

(54) BATTERY MODULE, BATTERY PACK COMPRISING BATTERY MODULE, AND VEHICLE COMPRISING BATTERY PACK

(71) Applicant: LG CHEM, LTD., Seoul (KR)

(72) Inventors: Kyung-Mo Kim, Daejeon (KR); Jeong-O Mun, Daejeon (KR); Jin-Yong Park, Daejeon (KR); Ho-June Chi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 740 days.

(21) Appl. No.: 17/051,102

(22) PCT Filed: Aug. 19, 2019

(86) PCT No.: PCT/KR2019/010511
§ 371 (c)(1),
(2) Date: Oct. 27, 2020

(87) PCT Pub. No.: WO2020/060039
PCT Pub. Date: Mar. 26, 2020

(65) Prior Publication Data
US 2021/0234241 A1     Jul. 29, 2021

(30) Foreign Application Priority Data
Sep. 20, 2018    (KR) ........................ 10-2018-0113241

(51) Int. Cl.
*H01M 10/00*     (2006.01)
*B23K 26/21*     (2014.01)
(Continued)

(52) U.S. Cl.
CPC ........... *H01M 50/516* (2021.01); *B23K 26/21* (2015.10); *H01M 50/209* (2021.01);
(Continued)

(58) Field of Classification Search
CPC ............. H01M 50/516; H01M 50/209; H01M 50/211; H01M 50/50; H01M 50/503;
(Continued)

(56) References Cited

U.S. PATENT DOCUMENTS 9,136,521 B2    9/2015   Lee et al.
10,481,208 B2 *   11/2019   Lee ........................ H01M 10/48
(Continued)

FOREIGN PATENT DOCUMENTS

CN      102195026 A     9/2011
CN      103943808 A     7/2014
(Continued)

OTHER PUBLICATIONS

Extended European Search Report for European Application No. 19863753.0, dated Jun. 21, 2021.
(Continued)

*Primary Examiner* — Nicholas P D'Aniello
(74) *Attorney, Agent, or Firm* — Birch, Stewart, Kolasch & Birch, LLP (57) ABSTRACT

Discussed is a battery module that includes a plurality of battery cells having electrode leads protruding in at least one direction; and at least one bus bar disposed at one side of the plurality of battery cells and connected to the electrode leads of the plurality of battery, the bus bar having a beam penetration prevention guider configured to prevent a laser beam from penetrating toward the plurality of battery cells during a laser welding.

10 Claims, 7 Drawing Sheets

(51) Int. Cl.
*H01M 50/209* (2021.01)
*H01M 50/211* (2021.01)
*H01M 50/50* (2021.01)
*H01M 50/503* (2021.01)
*H01M 50/516* (2021.01)
*H01M 50/528* (2021.01)
*H01M 50/536* (2021.01)

(52) U.S. Cl.
CPC ......... *H01M 50/211* (2021.01); *H01M 50/50* (2021.01); *H01M 50/503* (2021.01); *H01M 50/528* (2021.01); *H01M 50/536* (2021.01); *H01M 2220/20* (2013.01)

(58) Field of Classification Search
CPC ............. H01M 50/528; H01M 50/536; H01M 2220/20; H01M 50/505; H01M 50/533; H01M 50/502; B23K 26/21; B23K 26/70; B23K 26/706; B23K 2101/38; Y02E 60/10; Y02T 10/70; B60K 6/28; B60L 50/50; B60L 50/60; B60L 50/66; B60Y 2200/91; B60Y 2200/92
See application file for complete search history.

(56) References Cited

U.S. PATENT DOCUMENTS

| | | | |
|---|---|---|---|
| 10,629,881 B2* | 4/2020 | Lee | ..................... H01M 50/271 |
| 2009/0208836 A1 | 8/2009 | Fuhr et al. | |
| 2010/0266889 A1 | 10/2010 | Kim | |
| 2011/0223478 A1 | 9/2011 | Han | |
| 2012/0315531 A1 | 12/2012 | Lev et al. | |
| 2013/0196211 A1 | 8/2013 | Park et al. | |
| 2014/0205889 A1 | 7/2014 | Kim et al. | |
| 2014/0255756 A1 | 9/2014 | Tsutsumi et al. | |
| 2015/0064544 A1 | 3/2015 | Park | |
| 2015/0072188 A1 | 3/2015 | Dulle | |
| 2015/0188146 A1 | 7/2015 | Shinto et al. | |
| 2015/0214553 A1 | 7/2015 | Yoo et al. | |
| 2015/0228957 A1 | 8/2015 | Jeong et al. | |
| 2015/0270525 A1 | 9/2015 | Jeong et al. | |
| 2016/0361782 A1 | 12/2016 | Saito et al. | |
| 2019/0189979 A1 | 6/2019 | Choi et al. | |
| 2019/0280279 A1* | 9/2019 | Lee | ..................... H01M 50/505 |

FOREIGN PATENT DOCUMENTS

| | | | |
|---|---|---|---|
| CN | 103996803 A | 8/2014 | |
| CN | 210489709 U | 5/2020 | |
| JP | 2007-335150 A | 12/2007 | |
| JP | 2008-270033 A | 11/2008 | |
| JP | 2011-249243 A | 12/2011 | |
| JP | 2012-252811 A | 12/2012 | |
| JP | 2013-214497 A | 10/2013 | |
| JP | 2015-56341 A | 3/2015 | |
| JP | 2015-141891 A | 8/2015 | |
| JP | 2017-134909 A | 8/2017 | |
| KR | 10-2012-0023263 A | 3/2012 | |
| KR | 10-2015-0024560 A | 3/2015 | |
| KR | 10-2015-0035595 A | 4/2015 | |
| KR | 10-2015-0089716 A | 8/2015 | |
| KR | 10-2015-0093426 A | 8/2015 | |
| KR | 10-2015-0109078 A | 10/2015 | |
| KR | 20-2017-0001766 U | 5/2017 | |
| KR | 10-2017-0094759 A | 8/2017 | |

OTHER PUBLICATIONS

International Search Report for PCT/KR2019/010511 (PCT/ISA/210) dated Nov. 26, 2019.
Indian Office Action for Indian Application No. 202017055992, dated Jan. 5, 2024, with an English translation.

* cited by examiner

-- CONVENTIONAL ART --

BATTERY MODULE, BATTERY PACK COMPRISING BATTERY MODULE, AND VEHICLE COMPRISING BATTERY PACK

TECHNICAL FIELD

The present disclosure relates to a battery module, a battery pack including the battery module, and a vehicle including the battery pack.

The present application claims priority to Korean Patent Application No. 10-2018-0113241 filed on Sep. 20, 2018 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module having at least one battery cell first, and then configure a battery pack by using at least one battery module and adding other components.

A conventional battery module or a conventional battery pack includes a plurality of battery cells. Here, electrode leads of the plurality of battery cells are electrically connected to each other through a bus bar. The electrical connection generally connects the electrode leads of the battery cells and the bus bar to each other by laser welding.

However, while the battery module or the battery pack is being manufactured, a gap space of a predetermined size may be generated between the electrode lead and the bus bar due to the assembling tolerance. If the gap space is generated, when the electrode lead and the bus bar are laser-welded, the laser beam may penetrate through the gap space and damage a body of the battery cell.

DISCLOSURE

Technical Problem

The present disclosure is directed to providing a battery module, which may prevent a laser beam from penetrating through a gap space generated due to assembling tolerance when an electrode lead of a battery cell and a bus bar are laser-welded to each other, a battery pack including the battery module, and a vehicle including the battery pack.

Technical Solution

In one aspect of the present disclosure, there is provided a battery module, comprising: a plurality of battery cells having electrode leads protruding in at least one direction; and at least one bus bar disposed at one side of the plurality of battery cells and connected to the electrode leads of the plurality of battery cells by laser welding, the bus bar having a beam penetration prevention guider configured to prevent a laser beam from penetrating toward the plurality of battery cells during the laser welding.

The electrode leads laser-welded to the at least one bus bar may be in close contact with both side surfaces of the at least one bus bar without being bent in a horizontal direction at an upper side of the at least one bus bar.

The beam penetration prevention guider may be provided to both side surfaces of the at least one bus bar.

The at least one bus bar may include a bus bar body configured to cover one side of the plurality of battery cells and formed to have a predetermined thickness; and guide chamfers provided at both sides of an upper portion of the bus bar body to guide the laser welding, and the beam penetration prevention guider may be formed to extend from the guide chamfer and be inclined to a lower side of the bus bar body.

The beam penetration prevention guider may be provided in a pair, and the pair of beam penetration prevention guiders may extend to be inclined downward from the guide chamfers, respectively.

A width between the pair of beam penetration prevention guiders may gradually increase from an upper side of the bus bar body to a lower side thereof.

The beam penetration prevention guider may be integrally formed with the bus bar body.

At least one end of the beam penetration prevention guider may be rounded.

In addition, the present disclosure provides a battery pack, comprising: at least one battery module according to the above embodiments; and a pack case configured to package the at least one battery module.

Moreover, the present disclosure provides a vehicle, comprising at least one battery pack according to the above embodiment.

Advantageous Effects

According to various embodiments as above, it is possible to provide a battery module, which may prevent a laser beam from penetrating through a gap space generated due to assembling tolerance when an electrode lead of a battery cell and a bus bar are laser-welded to each other, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
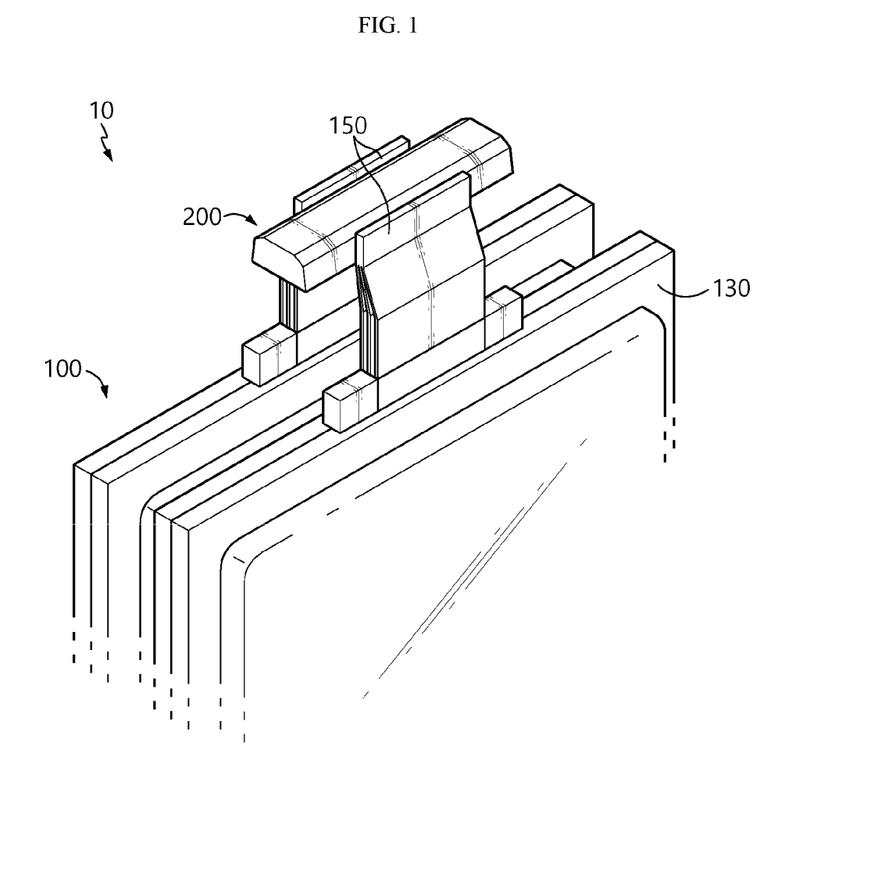
FIG. 1 is a diagram for illustrating a battery module according to an embodiment of the present disclosure.
Figure 2:
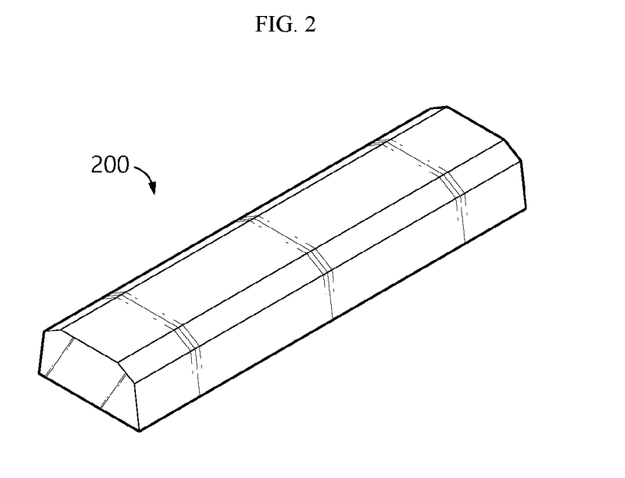
FIG. 2 is a diagram for illustrating a bus bar of the battery module of FIG. 1.
Figure 3:
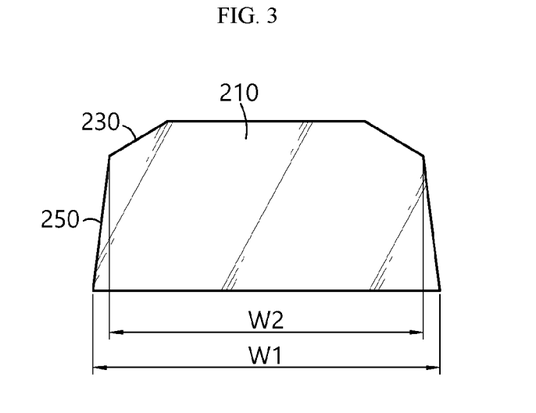
FIG. 3 is a cross-sectioned view showing the bus bar of FIG. 2.
Figure 4:
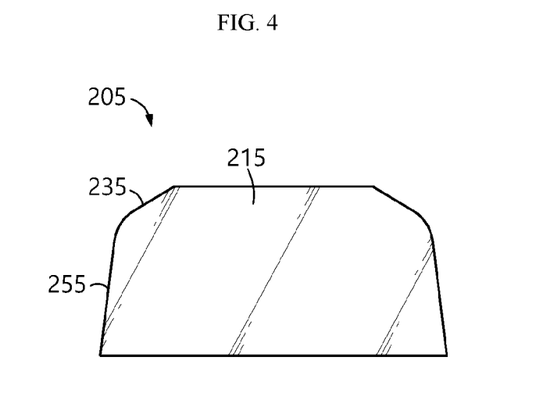
FIG. 4 is a diagram for illustrating another embodiment of the bus bar of FIG. 3.

FIG. 1 is a diagram for illustrating a battery module according to an embodiment of the present disclosure, FIG. 2 is a diagram for illustrating a bus bar of the battery module of FIG. 1, FIG. 3 is a cross-sectioned view showing the bus bar of FIG. 2, and FIG. 4 is a diagram for illustrating another embodiment of the bus bar of FIG. 3.

Referring to FIGS. 1 to 4, the battery module 10 may include battery cells 100 and a bus bar 200. Moreover, the battery module 10 may further include other components of the battery module 10 and additional components such as a module case that accommodates the battery cells 100, the bus bar 200, other components and the like, though not shown in the figures.

A plurality of battery cells 100 may be provided. The plurality of battery cells 100 may be electrically connected to each other through the bus bar 200, explained later. Each of the plurality of battery cells 100 may be a secondary battery such as a pouch-type secondary battery.

Each of the plurality of battery cells 100 may include an electrode assembly 110 (see FIG. 7), a battery case 130, and an electrode lead 150.

The electrode assembly 110 may include a positive electrode plate, a negative electrode plate, and a separator. The electrode assembly 100 is well known in the art and thus will not described in detail.

The battery case 130 may be made of a laminate sheet including a resin layer and a metal layer and may package the electrode assembly 110. The battery case 130 is well known in the art and thus will not described in detail.

The electrode lead 150 is electrically connected to the electrode assembly 110 and may protrude out of the battery case 130 in at least one direction. The electrode lead 150 is provided in a pair, and the pair of electrode leads 150 may include a positive electrode lead and a negative electrode lead.

The electrode lead 150 may be electrically connected to the electrode leads 150 of a neighboring battery cell 100 through the bus bar 200, explained later. Here, the electrical connection may be performed by laser welding.

The bus bar 200 is for electrical connection of the plurality of battery cells 100, and at least one bus bar 200 or a plurality of bus bars 200 may be provided. The bus bar 200 is disposed at one side of the plurality of battery cells 100 and may be connected to the electrode leads 150 of the plurality of battery cells 100 by laser welding.

Here, the electrode leads 150 of the battery cells 100 laser-welded to the bus bar 200 may be in close contact with both side surfaces of the bus bar 200 without being bent in a horizontal direction at an upper side of the bus bar 200, and the electrode leads 150 may be electrically connected by laser welding at both side surfaces of the bus bar 200.

That is, in this embodiment, the electrode leads 150 of the battery cells 100 connected to the bus bar 200 may be welded to the bus bar 200 without bending. Accordingly, in this embodiment, a separate additional bending process for connecting the electrode leads 150 to the bus bar 200 may be omitted, thereby improving the manufacturing process efficiency for the battery module 10.

Hereinafter, the bus bar 200 will be described in more detail.

The bus bar 200 may include a bus bar body 210, guide chamfers 230, and a beam penetration prevention guider 250.

The bus bar body 210 covers one side of the plurality of battery cells 100, for example an upper side of the plurality of battery cells 100 in this embodiment, and may be formed to have a predetermined thickness and a predetermined length.

The guide chamfers 230 are provided at both sides of an upper portion of the bus bar body 210 and may guide the laser welding. The guide chambers 230 may be inclined downward with a predetermined inclination angle.

The beam penetration prevention guider 250 is to prevent a laser beam from penetrating toward the plurality of battery cells 100 during the laser welding and may be provided at both side surfaces of the bus bar 200, specifically at both side surfaces of the bus bar body 210.

More specifically, the beam penetration prevention guider 250 may be integrally formed with the bus bar body 210 and extend from the guide chamfer 230 to be inclined to a lower side of the bus bar body 210.

Here, the beam penetration prevention guider 250 may be inclined to have a different inclination angle from the guide chamfer 230. In addition, the inclination angle of the beam penetration prevention guider 250 with respect to the vertical direction may be smaller than an entering angle of a laser beam A of a laser welding device L, explained later.

The beam penetration prevention guider 250 may be provided in a pair. The pair of beam penetration prevention guider 250 may extend downward from the guide chamfers 230, respectively.

The width W1, W2 between the pair of beam penetration prevention guiders 250 is gradually increased from an upper side of the bus bar body 210 to a lower side thereof. Accordingly, the width W1 at the lower side of the pair of beam penetration prevention guiders 250 may be greater than the width W2 at the upper side of the pair of beam penetration prevention guiders 250.

Meanwhile, as shown in FIG. 4, at least one end, specifically an upper end, of the pair of beam penetration prevention guiders 255 may be rounded in the bus bar body 210 of the bus bar 205. Accordingly, the contact portion between the pair of beam penetration prevention guiders 255 and the guide chamfer 235 may be rounded, thereby effectively preventing the end of the electrode leads 150 of the battery cells 100 from being damaged. If the contact portion between the pair of beam penetration prevention guiders 255 and the guide chamfer 235 is sharp, the end of the electrode leads 150 of the battery cells 100 may be damaged.

Hereinafter, the laser welding between the electrode leads 150 of the battery cells 100 and the bus bar 200 in the battery module 10 according to the this embodiment will be described in more detail.

Figure 5:
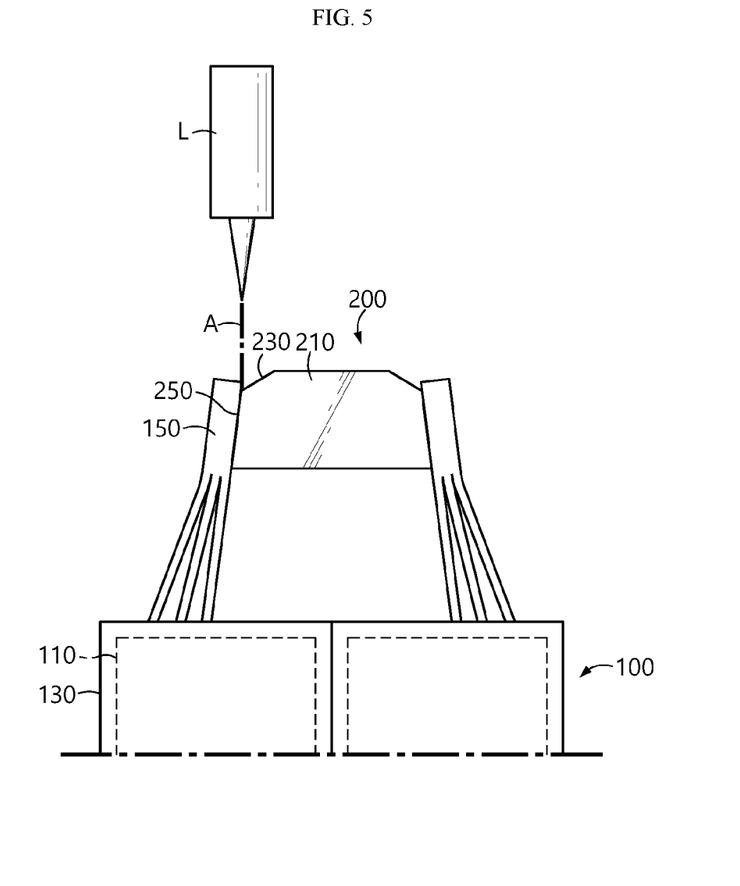
FIG. 5 is a diagram for illustrating laser welding between electrode leads of battery cells and a bus bar at the battery module of FIG. 1.

FIG. 5 is a diagram for illustrating laser welding between the electrode leads of the battery cells and the bus bar at the battery module of FIG. 1.

Referring to FIG. 5, when the electrode leads 150 of the battery cells 100 and the bus bar 200 are electrically connected, first, the electrode leads 150 of the battery cells 100 may be connected to the pair of beam penetration prevention guiders 250 of the bus bar 200, respectively.

In addition, the laser beam A may be irradiated from the laser welding device L at an upper side of the bus bar 200 to a contact portion of the electrode lead 150 and the beam penetration prevention guider 250, thereby connecting the electrode lead 150 and the bus bar 200 to each other by welding. At this time, the guide chamfer 230 may guide the laser beam A of the laser welding device L to be more accurately irradiated to the contact portion.

Meanwhile, due to the assembling tolerance generated while the battery module 10 is being manufactured, the electrode leads 150 of the battery cells 100 may not be in perfect contact with the bus bar 200.

Figure 6:
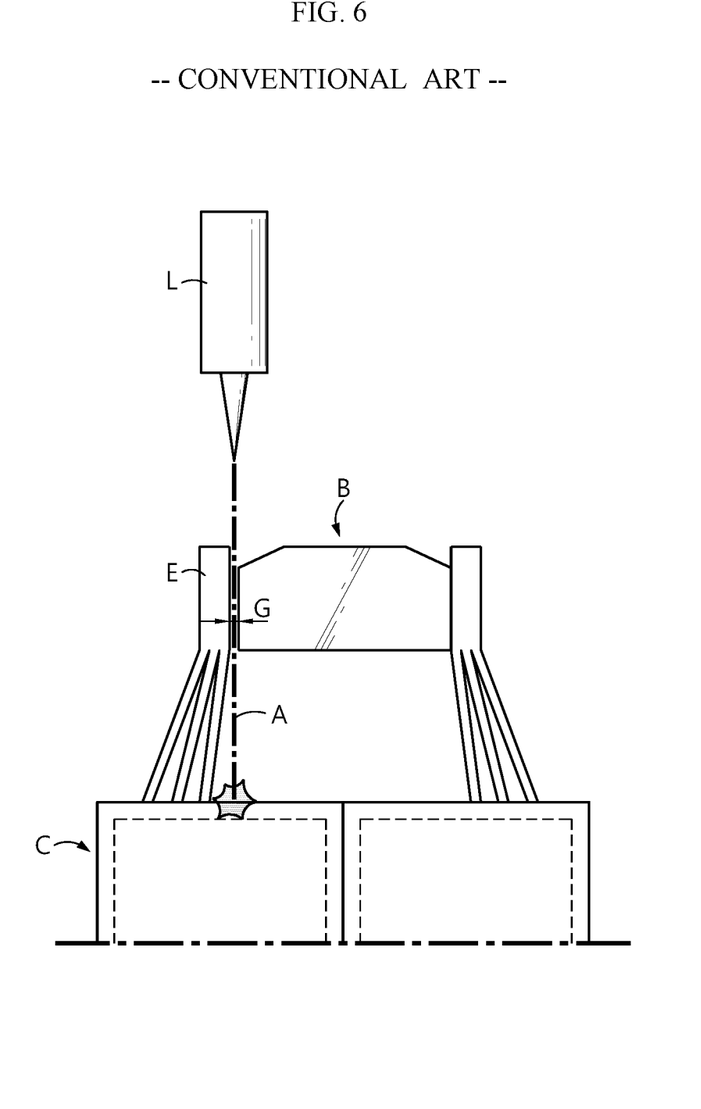
FIG. 6 is a diagram for illustrating laser welding when a gap is generated between electrode leads of conventional battery cells and a bus bar.
Figure 7:
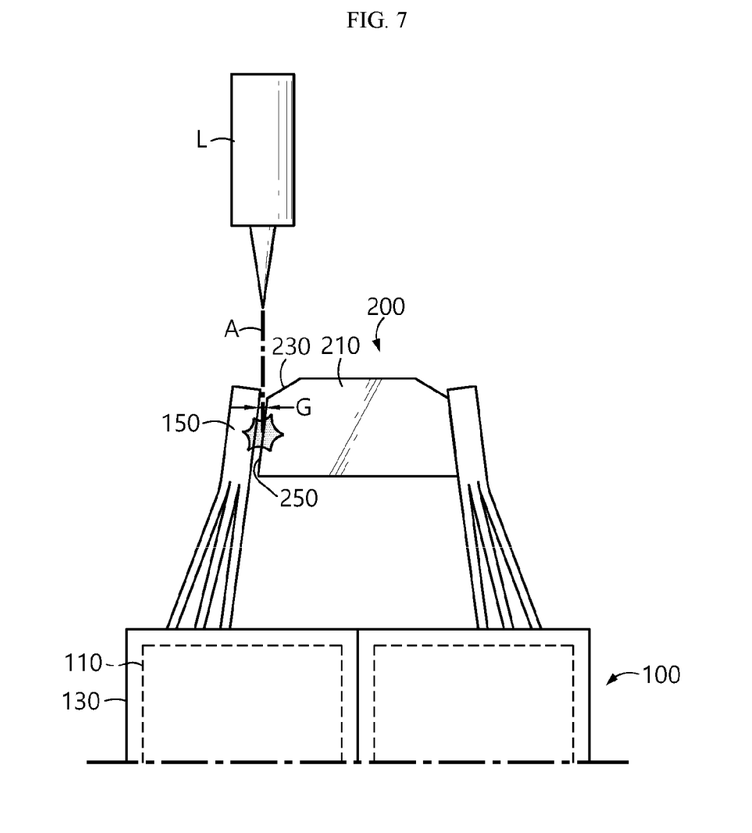
FIG. 7 is a diagram for illustrating laser welding when a gap is generated between the electrode leads of the battery cells of FIG. 1 and the bus bar.

FIG. 6 is a diagram for illustrating laser welding when a gap is generated between electrode leads of conventional battery cells and a bus bar, and FIG. 7 is a diagram for illustrating laser welding when a gap is generated between the electrode leads of the battery cells of FIG. 1 and the bus bar.

Referring to FIG. 6, if an electrode lead E of a conventional battery cell C is not in perfect contact with a bus bar B, a predetermined gap space G may be generated between the electrode lead E and the bus bar B.

In this case, the laser beam A irradiated from the laser welding device L may penetrate through the gap space G generated due to the assembling tolerance, thereby damaging the body of the battery cell C. Depending on the degree of irradiation of the penetrated laser beam A, the battery cell C may be damaged, and in a more severe case, the battery cell B may be exploded.

Referring to FIG. 7, in this embodiment, even though the predetermined gap space G is generated due to the assembling tolerance, by means of the beam penetration prevention guider 250 of the bus bar 200, it is possible to effectively prevent the laser beam A irradiated from the laser welding device L from penetrating toward the battery cell 100 at the lower side of the bus bar 200.

Thus, in this embodiment, even though the gap space G is generated due to the assembling tolerance, it is possible to prevent the laser beam A from directly penetrating toward the battery cell 100 at the lower side of the bus bar 200, by means of the beam penetration prevention guider 250 of the bus bar 200.

Therefore, in this embodiment, by means of the laser penetration prevention guider 250 formed at the bus bar 200, when the electrode leads 150 of the battery cells 100 and the bus bar 200 are laser-welded, it is possible to effectively prevent the battery cells 100 from being damaged or exploded due to the laser beam A of the laser welding device L.

Figure 8:
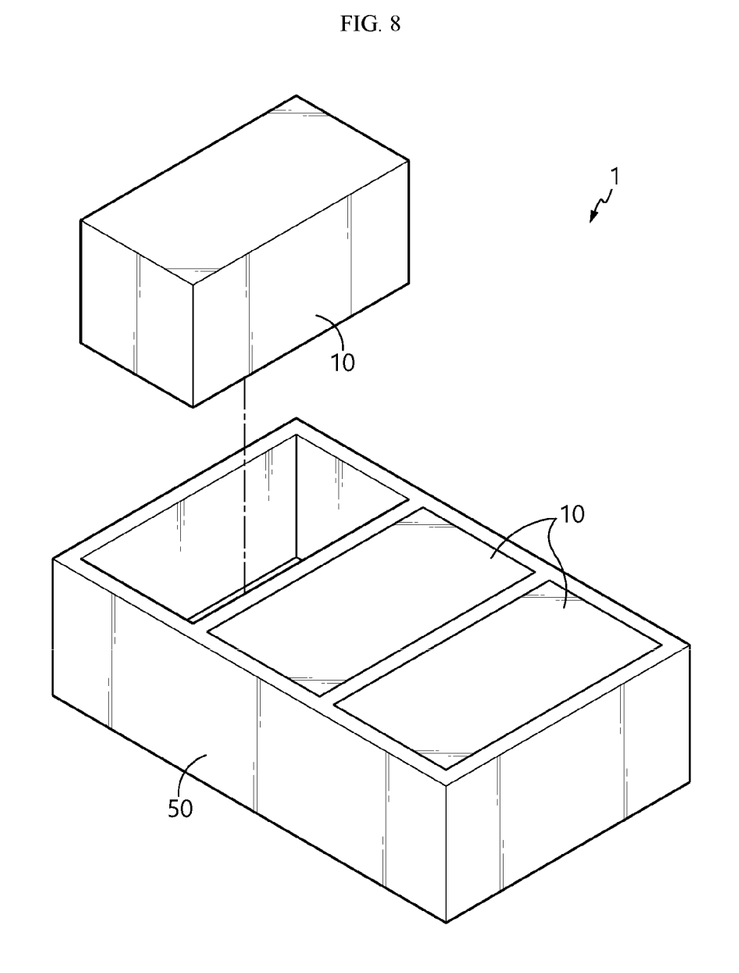
FIG. 8 is a diagram for illustrating a battery pack according to an embodiment of the present disclosure.
Figure 9:
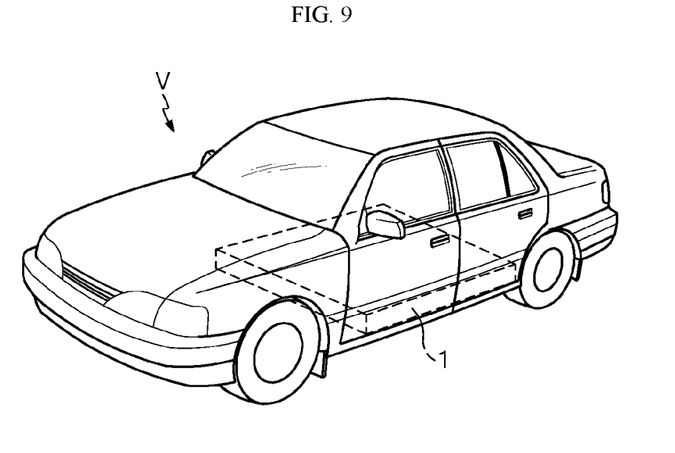
FIG. 9 is a diagram for illustrating a vehicle according to an embodiment of the present disclosure.

FIG. 8 is a diagram for illustrating a battery pack according to an embodiment of the present disclosure, and FIG. 9 is a diagram for illustrating a vehicle according to an embodiment of the present disclosure.

Referring to FIGS. 8 and 9, a battery pack 1 may include at least one battery module 10 according to the former embodiment and a pack case 50 for packaging the at least one battery module 10.

The battery pack 1 may be provided to a vehicle V as a fuel source of the vehicle V. As an example, the battery pack 1 may be provided to a vehicle V such as an electric vehicle, a hybrid vehicle, and various other-type vehicles capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as a vehicle V, which have the battery pack 1, include the battery module 10 as described above, and thus it is possible to implement a battery pack 1 having all the advantages of the battery module 10 described above, or devices, instruments, facilities or the like such as a vehicle V, which have the battery pack 1.

According to various embodiments as above, it is possible to provide a battery module 10, 20, which may prevent the laser beam A from penetrating through the gap space G generated due to assembling tolerance when the electrode lead 150 of the battery cell 100 and the bus bar 200 are laser-welded to each other, a battery pack 1 including the battery module 10, and a vehicle V including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a plurality of battery cells having electrode leads protruding in at least one direction; and
at least one bus bar disposed at one side of the plurality of battery cells and connected to the electrode leads of the plurality of battery cells, the at least one bus bar having a beam penetration prevention guider configured to prevent a laser beam from penetrating toward the plurality of battery cells during a laser welding,
wherein the at least one bus bar includes:
a bus bar body configured to cover one side of the plurality of battery cells and formed to have a predetermined thickness,
guide chamfers provided at opposite sides of an upper portion of the bus bar body to guide the laser welding, and
the beam penetration prevention guider provided in a pair, and the pair of beam penetration prevention guiders provided to the opposite sides of the bus bar body, respectively, wherein the pair of beam penetration prevention guiders extend to be inclined downward from the guide chamfers towards a lower portion of the bus bar body, respectively, wherein inclined surfaces of the guide chamfers directly connect to opposite ends of an uppermost surface of the bus bar body, respectively, wherein inclined surfaces of the pair of beam penetration prevention guiders directly connect to the inclined surfaces of the guide chamfers, respectively, wherein the inclined surfaces of the pair of beam penetration prevention guiders directly connect to opposite ends of a lowermost surface of the bus bar body, respectively, and wherein the electrode leads laser-welded to the at least one bus bar are in contact only with the pair of beam penetration prevention guiders constituting the opposite side surfaces of the bus bar body without being bent in a horizontal direction at an upper side of the at least one bus bar.

2. The battery module according to claim 1,
wherein a width between the pair of beam penetration prevention guiders gradually increases from the upper portion of the bus bar body to the lower portion of the bus bar body.

3. The battery module according to claim 1,
wherein the pair of beam penetration prevention guiders are integrally formed with the bus bar body.

4. The battery module according to claim 1,
wherein at least one end of the pair of beam penetration prevention guiders is rounded.

5. A battery pack, comprising:
at least one battery module according to claim 1; and
a pack case configured to package the at least one battery module.

6. A vehicle, comprising:
at least one battery pack according to claim 5.

7. The battery module according to claim 1,
wherein the at least one bus bar is attached to the electrode leads by the laser welding.

8. The battery module according to claim 1,
wherein the inclined surfaces of the guide chamfers are angled relative to the inclined surfaces of the pair of beam penetration prevention guiders, respectively.

9. The battery module according to claim 8,
wherein the inclined surfaces of the guide chamfers and the inclined surfaces of the pair of beam penetration prevention guiders are not parallel to the lowermost surface of the bus bar body.

10. The battery module according to claim 1, wherein the inclined surfaces of the pair of beam penetration prevention guider are inclined with a different inclination angle from the inclined surfaces of the guide chamfers, respectively.

\* \* \* \* \*